United States Patent [19]

Yamato et al.

[11] Patent Number: 4,980,079

[45] Date of Patent: Dec. 25, 1990

[54] AGENT FOR PREVENTING VINYL CHLORIDE POLYMER BUILD-UP

[75] Inventors: Tamio Yamato, Tokuyama; Kenji Asada, Kudamatsu; Yutaka Miyauchi; Kenji Hotehama, both of Tokuyama; Teruaki Inagi, Kudamatsu, all of Japan

[73] Assignee: Sun Arrow Chemical Co., Ltd., Tokuyama, Japan

[21] Appl. No.: 337,056

[22] Filed: Apr. 12, 1989

[30] Foreign Application Priority Data

Jan. 17, 1989 [JP] Japan ................................. 1-5943

[51] Int. Cl.$^5$ .................... C08G 85/00; C07C 239/10
[52] U.S. Cl. .................................. 252/180; 252/80; 252/82; 526/62; 526/74; 564/300
[58] Field of Search ........................ 252/80, 82, 180; 526/62, 64; 564/300

[56] References Cited

U.S. PATENT DOCUMENTS 4,355,141 10/1982 Okada .................................. 526/62

FOREIGN PATENT DOCUMENTS 0098080 8/1977 Japan .

Primary Examiner—Paul Lieberman
Assistant Examiner—Alexander Glyka
Attorney, Agent, or Firm—Birch, Stewart, Kolasch & Birch

[57] ABSTRACT

An agent for preventing vinyl chloride polymer build-up, which contains as the effective ingredient a reaction product of ammonium salt or a metal salt of N-nitrosophenylhydroxylamine with an aldehyde.

14 Claims, No Drawings

AGENT FOR PREVENTING VINYL CHLORIDE POLYMER BUILD-UP

This invention relates to an agent for preventing vinyl chloride polymer build-up. More specifically the invention relates to a chemical agent which exhibits excellent effect, particularly in occasions of polymerizing vinyl chloride, for preventing build-up of vinyl chloride polymers as scales on inner walls or the like of the polymerization vessels.

It is known that generally in polymerizing vinyl chloride monomer or monomeric mixtures composed chiefly of vinyl chloride and other minor copolymerizable monomer(s) (hereinafter those will be collectively referred to as vinyl chloride monomers), large quantities of polymer scale build up on inner walls of polymerization vessels, agitation vanes, baffle plates and other parts coming into contact with the monomers. Such build-up not only leads to reduction in resultant vinyl chloride polymer (viz., the polymers of above vinyl chloride monomers) yield but interferes with the heat transfer (cooling ability) of the walls of the polymerization vessels used, and hence renders an adequate polymerization temperature control difficult. There is also a problem that the scales peeled off from the build-up mix into the product polymer to invite substantial quality degradation, e.g., the phenomenon conventionally referred to as fish-eye. Therefore, it has been a customary practice to remove from the polymerization vessel the build-up after completion of each batch polymerization and after such a cleaning the vessel is again used for polymerizing another batch. The great labor and time required for this cleaning reduce the industrial working ratio (batch number) of polymerization vessels, which leads to an increase in the cost of so produced vinyl chloride polymer products.

Heretofore many methods for preventing vinyl chloride polymer build-up on inside the polymerization vessels have been proposed, which can be classified into the following two large groups of embodiments.

One of them comprises addition of specific compound(s) to the polymerization system in occasions of polymerizing vinyl chloride monomers. For example, Japanese Patent Publication No. 37988/1970 teaches a method of carrying out the polymerization using cellulose derivatives as a dispersant and maintaining pH of the system at 3 or higher. Also U.S. Pat. 3,926,910 teaches addition of nitrous acid or a nitrite. Besides the above, numbers of methods of adding specific compounds to the polymerization systems were proposed. While those methods may exhibit certain build-up-preventing effect, however, the addition of each specified compound(s) is apt to invite reduction in polymerization rate of vinyl chloride monomers or deterioration in various physical properties of the resultant vinyl chloride polymers, e.g., impairing thermal stability or causing coloring of the polymers.

The other group of embodiments encompass, in advance of polymerizing vinyl chloride monomers, coating the parts of the polymerization vessel coming into contact with the monomers, such as inner walls, with a specific compound or compounds. For example, U.S. Pat. No. 4,093,787 teaches a method of depositing on the reactor walls a cross-linked polymeric substance containing polar groups which is formed from aldehyde as one component and a phenol or the like. U. K. Pat. No. 1,536,160 teaches a method of coating reactor walls with an organic dye, and U.S. Pat. No. 4,320,215, coating a pyrogallol derivative or a hydroxyhydroquinone derivative of a molecular weight at least 250. Furthermore, U.S. Pat. No. 4,355,141 discloses a method of coating a co-condensate obtained by reacting an initial condensate of phenol and aldehyde with a nitrogen-containing compound such as nitrophenol, and U.S. Pat. No. 4,555,555, a method of coating a condensate of pyrogallol or hydroxyhydroquinone with an aromatic aldehyde.

In these methods, generally when the coating amount of the chemical is little, a sufficient effect to prevent build-up cannot be accomplished, and conversely when the coating amount is too much, not only the heat transfer (cooling ability) of the reactor walls is impaired, but the coating is apt to be eluted or peeled off to get mixed into the formed vinyl chloride polymer to deteriorate quality of the product. Solutions for such defects have been continuously attempted by improving the chemicals to be coated, like those specific compounds named above, but it is still a keen demand that a chemical which, when applied onto inner walls of the polymerization vessel, strongly adheres to the coated surfaces and exhibits excellent anti-scaling effect to vinyl chloride polymer at a low coating amount and furthermore allows, with a single time application, continuous batch polymerization of vinyl chloride monomers as long as possible without formation of build-up, should be developed.

Accordingly, an object of the present invention is to provide a chemical agent which exhibits excellent preventive effect against build-up of vinyl chloride polymer occurring in polymerization of vinyl chloride monomers (which may be hereinafter simply referred to as an agent for preventing vinyl chloride polymer build-up or simply an anti-scalant).

Another object of the present invention is to provide an agent for preventing vinyl chloride polymer build-up of excellent durability, which can be used over many hours in polymerization of vinyl chloride monomers.

Still another object of the present invention is to provide a process for formulating an agent for preventing vinyl chloride polymer build-up with high efficiency.

A further object of the present invention is to provide a process to enable continuous operation of batch polymerization of vinyl chloride monomers without occurrence of build-up or reduction in polymerization rate, which uses an agent for preventing vinyl chloride polymer build-up of which single application to inside the polymerization vessel is sufficient to achieve this object.

Other objects and advantages of the present invention will become apparent from reading the following specification.

Such objects and advantages of the present invention can be accomplished by, according to the present invention, an agent for preventing vinyl chloride polymer build-up, which contains as the effective ingredient a reaction product of ammonium salt or a metal salt of N-nitrosophenlylhydroxylamine with an aldehyde.

Ammonium salt or metal salts of N-nitrosophenylhydroxylamine is expressed by the formula below:

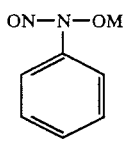

(in which M stands for NH$_4$ or a metal). Preferred metal M include those of Group IA metals of the periodic table such as Na; Group IB metals such as Cu; Group IIA metals such as Mg and Ca; Group IIIB metals such as Al; and Group VIII metals such as Fe. Ammonium salt of N-nitrosophenylhydroxylamine is often referred to by the name of "Cupferron", and is readily available in the market. Metal salts of N-nitrosophenylhydroxylamine can be easily prepared through ion-exchange of Cupferron with the intended metal.

Aldehydes to be used in the present invention may be any compounds containing aldehyde groups and are subject to no other critical limitations. A wide range of aldehydes expressed by the formula, R-CHO (in which R stands for hydrogen, $C_{1-15}$ alkyl, aryl which may be substituted with a lower alkyl or a heterocyclic group) can be used. As preferred examples, such aliphatic aldehydes as formaldehyde and acetaldehyde; such aromatic aldehydes as benzaldehyde; and such heterocyclic aldehydes as fulfural, etc. can be named.

The reaction product of ammonium salt or a metal salt of N-nitrosophenylhydroxylamine with an aldehyde is generally tar-like, blackish brown in color, insoluble in water but soluble in organic solvents. According to infrared absorption spectrum and liquid chromatography analysis of the product, presence of benzene ring substituted at 2- and 3-positions is identified, and the product is presumed to be an initial condensate containing plural components. While its structure is assumed to be as below, the present invention is not restricted thereto:

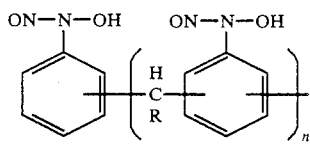

(in which R stands for hydrogen, $C_{1-15}$ alkyl, aryl which may be substituted with a lower alkyl or heterocyclic group; and n is at least 1).

Such reaction products usable in the present invention can be obtained by reacting ammonium salt or a metal salt of N-nitrosophenylhydroxylamine with an aldehyde in an aqueous medium, in the presence of an ordinary acidic catalyst such as phosphoric, sulfuric or hydrochloric acid, normally at 80–105° C., particularly 90–100° C. While the reaction ca be carried out using 0.2–10 mols of an aldehyde per mol of ammonium salt or a metal salt of N-nitrosophenylhydroxylamine, it is preferred to use at least one mol, normally 1.1–10 mols, particularly 1.5–3.0 mols, of aldehyde per mol of such a salt in order to increase the reaction yield.

The crude product obtained through the reaction can be effectively used as an agent for preventing vinyl chloride polymer build-up as it is, but the durability of the scale-preventing effect is insufficient because it still contains unreacted aldehyde. Therefore, it is desirable to first remove unreacted aldehyde from the crude reaction product and thereafter use the same as an agent for preventing vinyl chloride polymer build-up. Removal of unreacted aldehyde is normally accomplished by such means as repetitive washing of the reaction product with warm water, followed by vacuum drying.

According to one of the embodiments of the present invention, an agent for preventing vinyl chloride polymer build-up having sufficient durability can be obtained with simplicity, by reacting ammonium salt or a metal salt of N-nitrosophenylhydroxylamine with aldehyde in the presence of an acidic catalyst and thereafter reacting the product with a phenol. That is, according to this embodiment, the crude reaction product obtained upon reacting ammonium salt or a metal salt of N-nitrosophenylhydroxylamine with aldehyde is reacted with a phenol as it is, without an intervening removal of unreacted aldehyde. It is found that whereby an anti-scalant exhibiting excellent durability similarly to that obtainable upon sufficiently removing the unreacted aldehyde from the reaction product can be obtained. According to this embodiment using phenol of the amount corresponding to that of the unreacted (excess) aldehyde (normally 0.5–2 mols per mol of ammonium salt or a metal salt of N-nitrosophenylhydroxylamine), it is unnecessary to remove unreacted aldehyde by such means as aqueous washing and reduced pressure fractionation from the crude reaction product, and a favorable agent for preventing vinyl chloride polymer build-up can be easily obtained. The final reaction product obtained i this embodiment is presumed to be a mixture of the condensate of ammonium salt or a metal salt of N-nitrosophenylhydroxylamine with an aldehyde, with addition product thereof with phenol and condensate of phenol with aldehyde.

Phenols useful for this embodiment are subject to no particular limitation, so long as they are reactable with aldehydes. Generally those phenols expressed by the formula below are preferred.

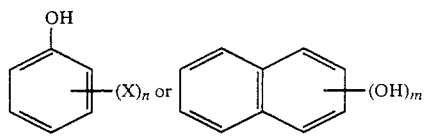

(in which X stands for a $C_{1-4}$ alkyl or hydroxyl group; n is a number of 0–3; and m is a number of 1–3). Examples of such phenols include monovalent phenols like phenol (carbolic acid), cresol, xylenol and ethyl phenol; divalent phenols like catechol, resorcinol and hydroquinone; trivalent phenols like pyrogallol and phloroglucinol; naphthols like naphthol, naphthalenediol and naphthalenetriol; and nuclear substituted derivatives of the foregoing.

Polymerization of vinyl chloride monomers to which the anti-scalant of the present invention is applied, includes as aforesaid not only homopolymerization of vinyl chloride but copolymerization of vinyl chloride with normally up to 40 % by weight of other copolymerizable monomer or monomers. Examples of such monomers copolymerizable with vinyl chloride include fatty acid vinyl esters such as vinyl acetate; acrylic acids such as acrylic acid, methyl acrylate, etc.; methacrylic acids such as methacrylic acid, methyl methacrylate, etc.; alpha-olefins such as ethylene, propylene, etc.; and styrene.

The polymerization system of such vinyl chloride monomers may be any of aqueous suspension, aqueous emulsion or bulk polymerization, which are carried out under known polymerization conditions and by known methods. For example, polymerization initiators can be used free from any particular limitation. Those most normally used are: organic peroxides such as di-2-ethylhexyl peroxydicarbonate, isopropyl peroxydicarbonate, lauroyl peroxide, tertiary butyl peroxypivalate and benzoyl peroxide, etc., and azo compounds such as azobisisobutyronitrile, α,α'-azobis-4-methoxy-2,4-dimethylvaleronitrile, etc.

The agent for preventing vinyl chloride polymer build-up is used as being applied, in advance of polymerization of vinyl chloride monomers, onto inner walls of a polymerization vessel and on the areas of the vessel which come to contact with the monomeric component, such as agitation vanes, condenser, junctions of pipes, etc. Consequently, the anti-scalant of the present invention is used as a solution formed by dissolving the reaction product of an ammonium salt or a metal salt of N-nitrosophenylhydroxylamine with aldehyde in a suitable organic solvent, at a concentration of about 0.01–50 % by weight, preferably 0.1–20 % by weight. The organic solvent is subject to no particular limitation so long as it has a good solvency power of said reaction product and has no detrimental effect on the polymerization of vinyl chloride monomers. For example, besides alcohols such as methanol, ethanol, isopropanol, etc., tetrahydrofuran, acetone, dimethylformamide, etc. can be advantageously used. The application or coating method is not critical and any known methods may be employed. For example, brushing, dipping, spray-coating with nozzles, etc. may be practiced. The coating amount is determined taking the scale-preventing effect (durability of the effect) and liable mixing of the coating into the formed vinyl chloride polymer into consideration. The intended effect can be achieved, however, normally at a coating amount within a range of 0.001–10 g/m$^2$, preferably 0.01–5 g/m$^2$.

Above-explained agent for preventing vinyl chloride polymer build-up of the present invention can almost perfectly prevent build-up on inner walls or the like of polymerization vessel during polymerization of vinyl chloride monomers therein, and therefore the resultant product polymer is completely free from mixing of the scale thereinto. Thus there is no fear of deterioration in physical properties of the products, and neither there is any defect such a retardation of polymerization reaction. According to the present invention, therefore, there is no necessity of interbatch cleaning after polymerization of a batch of vinyl chloride monomers, but the subsequent batch polymerization can be continuously operated. Furthermore, according to the present invention, it is possible, with single time application of the anti-scalant, to continuously practice polymerization of 10 batches or more of vinyl chloride monomers.

EXAMPLES

The physical properties and performance of the vinyl chloride polymers obtained in the following Examples and Comparative Examples were measured by the methods identified below.
(1) Average degree of polymerization: JIS K-6721
(2) Bulk density: JIS K-6721
(3) Particle size distribution: measured with the sieve specified by JIS Z-8801
(4) Fish-eye:
A mixture composed of 100 parts of polyvinyl chloride, 60 parts of di-2-ethylhexyl phthalate, 2 parts of Ba-Zn stabilizer and 3.5 parts of a pigment was roll-milled at 135° C. for 7 minutes and molded into a 0.3 mm/ thick sheet of 5 cm×10 cm in size The number of fish-eyes present on the sheet surface was counted.

Example 1

In a three-necked flask equipped with a reflux condenser and an agitator, 31 g (0.2 mol) of ammonium salt of N-nitrosophenylhydroxylamine (Cupferron) and 39 g of phosphoric acid were dissolved in 200 cc of water. Then 42 g (0.4 mol) of benzaldehyde was fed thereinto and the temperature of the system was gradually raised to 95° C. under stirring. At said temperature the reaction was continued for 12 hours under reflux, to provide a water-insoluble, blackish brown oily crude reaction product. The crude reaction product was washed repeatedly with warm water under stirring, whereby the unreacted benzaldehyde and phosphoric acid were dissolved and removed. Removing the moisture under reduced pressure, 44 g of refined reaction product was obtained, which was then dissolved in methanol to be formulated into a coating liquid of an anti-scalant of a concentration 0.5 % by weight.

Onto the inner walls of a stainless steel polymerization vessel of 2000 liters in capacity which was equipped with an agitation vanes and onto said agitation vanes, above coating liquid was uniformly spray-coated at a ratio of 0.g/m$^2$ (solid content). From the coating methanol was driven off by evaporation.

This polymerization vessel was charged with 1000 kg of deionized water, 300 g of partially saponified polyvinyl alcohol and 250 g of di-2-ethylhexyl peroxydicarbonate and deaerated. Then 600 kg of vinyl chloride was charged thereinto and the system was polymerized at 57° C. under stirring. At the time when the pressure inside the polymerization vessel dropped from the initial level by 2.5 kg/cm$^2$, unreacted monomer was purged and the polymerization was terminated. The polymerization time was 5 hours and 5 minutes. Then the formed vinyl chloride polymer slurry was withdrawn from the polymerization vessel, and inner walls of the polymerization vessel and the agitator were observed. No build-up of vinyl chloride polymer was found.

Thus obtained vinyl chloride polymer had an average degree of polymerization of 1040, bulk density of 0.51 g/ml, particle size distribution of 83% passage through a 100-mesh sieve, and fish-eye number of zero.

The inside of the polymerization vessel was washed with water, and without intervening application of the coating liquid, vinyl chloride was charged thereinto under the conditions similar to those of the first run and the polymerization was repeated. After the polymerization was terminated, vinyl chloride polymer slurry was withdrawn from the vessel and the inner walls and agitation vanes of the vessel were examined. Neither any build-up of vinyl chloride polymer was observed.

The above operation cycle of washing inside of the polymerization vessel with water and subsequent polymerization of vinyl chloride was repeated continuously and it was confirmed that at least 10 times (batch number) of such polymerization can be repeated.

Example 2

The reaction as in Example 1 was carried out under similar conditions except that ammonium salt of N-nitrosophenylhydroxylamine used in Example 1 was replaced by 29 g (0.2 mol) of an aluminum salt of N-nitrosophenylhydroxylamine. The reaction product obtained was dissolved in methanol to be formulated into a coating liquid of an anti-scalant.

Then the coating liquid was applied to inner walls and agitator of the same polymerization vessel used in Example 1, and polymerization of vinyl chloride was practiced in the vessel under identical conditions with those employed in Example 1. After withdrawing the slurry of formed vinyl chloride polymer, the inner walls and agitator of the vessel were examined. Build-up of vinyl chloride polymer was not at all observed.

Example 3

The reaction was carried out under similar conditions to those of Example 1, except that 18 g (0.4 mol) of acetaldehyde was used in place of benzaldehyde. The reaction product formed was dissolved in methanol to be formulated into a coating liquid of an anti-scalant.

The coating liquid was applied onto the inner walls and agitator of the same polymerization vessel as employed in Example 1 in the similar manner to Example 1, and thereafter polymerization of vinyl chloride was practiced under the conditions similar to those of Example 1. After withdrawing the vinyl chloride polymer formed, the inner walls and agitator of the polymerization vessel were examined. No build-up of vinyl chloride polymer was at all observed.

Example 4

The reaction was conducted under the conditions similar to those of Example 1, except that the benzaldehyde was replaced by 12 g (0.4 mol) of formaldehyde. So formed reaction product was dissolved in methanol to a concentration of 0.5 % by weight, and applied onto the inner walls and agitation vanes of the same polymerization vessel as employed in Example 1 at an application ratio of 0.1 g/m$^2$.

Polymerization was carried out in the polYmerization vessel in the similar manner to Example 1. No build-up on the walls of the vessel was observed.

Example 5

The reaction was conducted under the conditions similar to those of Example 1, except that the benzaldehyde was replaced by 38 g (0.4 mol) of furfural. So formed reaction product was dissolved in methanol to a concentration of 0.5 % by weight, and applied onto the inner walls and agitation vanes of the same polymerization vessel as employed in Example 1 at an application ratio of 0.1 g/m$^2$.

Polymerization was carried out in the polymerization vessel in the similar manner to Example 1. No build-up on the walls of the vessel was observed.

Example 6

The reaction was conducted under the conditions similar to those of Example 1, except that the benzaldehyde was replaced by 48 g (0.4 mol) of m-tolualdehyde. So formed reaction product was dissolved in methanol to a concentration of 0.5 % by weight, and applied onto the inner walls and agitator of the same polymerization vessel as employed in Example 1 at an application ratio of 0.1 g/m$^2$.

Polymerization was carried out in the polymerization vessel in the similar manner to Example 1. No build-up on the walls of the vessel was observed.

Example 7

The reaction was conducted under the conditions similar to those of Example 1, except that the Cupferron was replaced by 32 g (0.2 mol) of sodium salt of N-nitrosophenylhydroxylamine. So formed reaction product was dissolved in methanol to a concentration of 0.5 % by weight, and applied onto the inner walls and agitator of the same polymerization vessel as employed in Example 1 at an application ratio of 0.1 g/m$^2$.

Polymerization was carried out in the polymerization vessel in the similar manner to Example 1. No build-up on the walls of the vessel was observed.

Example 8

The reaction was conducted under the conditions similar to those of Example 1, except that the Cupferron was replaced by 30 g (0.2 mol) of magnesium salt of N-nitrosophenylhydroxylamine. So formed reaction product was dissolved in methanol to a concentration of 0.5 % by weight, and applied onto the inner walls and agitator of the same polymerization vessel as employed in Example 1 at an application ratio of 0.1 g/m$^2$.

Polymerization was carried out in the polymerization vessel in the similar manner to Example 1. No build-up on the walls of the vessel was observed.

Example 9

The reaction was conducted under the conditions similar to those of Example 1, except that the Cupferron was replaced by 31 g (0.2 mol) of iron salt of N-nitrosophenylhydroxylamine. So formed reaction product was dissolved in methanol to a concentration of 0.5 % by weight, and applied onto the inner walls and agitator of the same polymerization vessel as employed in Example 1 at an application ratio of 0.1 g/m$^2$.

Polymerization was carried out in the polymerization vessel in the similar manner to Example 1. No build-up on the walls of the vessel was observed.

Example 10

The reaction was conducted under the conditions similar to those of Example 1, except that the benzaldehyde was replaced by 31 g (0.4 mol) of caprinaldehyde. So formed reaction product was dissolved in methanol and applied onto the inner walls and agitation vanes of the same polymerization vessel as employed in Example 1. Polymerization was carried out in the polymerization vessel in the similar manner to Example 1. No build-up on the walls and agitation vanes of the vessel was observed.

Example 11

The reaction was conducted under the conditions similar to those of Example 1, except that the Cupferron was replaced by 34 g (0.2 mol) of copper salt of N-nitrosophenylhydroxylamine. So formed reaction product was dissolved in methanol and applied onto the inner walls and agitation vanes of the same polymerization vessel as employed in Example 1.

Polymerization was carried out in the polymerization vessel in the similar manner to Example 1. No build-up on the walls and agitator the vessel was observed.

Example 12

In the same flask as used in Example 1, 31 g (0.2 mol) of ammonium salt of N-nitrosophenylhydroxylamine was dissolved in 200 cc of water, and to the solution further 42 g (0.4 mol) of benzaldehyde was added. Then the temperature inside the flask was gradually raised to 95° C. under stirring. Then 98 g of phosphoric acid was added, and at the same temperature the reaction was continued for 6 hours under reflux. Thereafter 25 g (0.2 mol) of pyrogallol was added, and the reaction was continued for additional 6 hours. Whereupon 90 g of a water-insoluble, blackish-brown resinous reaction product was obtained. This reaction product was dissolved in methanol to be formulated into a coating liquid of an anti-scalant at a concentration of 0.5 % by weight.

Inside of the same polymerization vessel as employed in Example 1 and the agitator therein were uniformly spray-coated with the above coating liquid at a ratio of 0.1 g/m² (as solid), and then the methanol was evaporated off. Vinyl chloride was charged in the polymerization vessel and polymerized under the conditions similar to those of Example 1. After withdrawing the vinyl chloride polymer slurry formed, the inner walls and agitation vanes of the polymerization vessel were examined. Build-up of vinyl chloride polymer was not at all observed.

The average degree of polymerization, bulk density, particle size distribution and number of fish-eyes were approximately same to those measured in Example 1.

The inside of the polymerization vessel employed for above polymerization was washed with water, and without intervening application of the coating liquid, vinyl chloride was charged thereinto under the conditions similar to those of the first run and the liquid, vinyl chloride was charged thereinto under the conditions similar to those of the first run and the polymerization was repeated. After the polymerization was terminated, vinyl chloride polymer slurry was withdrawn from the vessel and the inner walls and agitation vanes of the vessel were examined. Scarcely any build-up of vinyl chloride polymer was observed.

The above operation cycle of washing the inside of the polymerization vessel with water and subsequent batch polymerization of vinyl chloride was repeated continuously. Even after polymerizing the 10th batch, scarcely any build-up inside the polymerization vessel was observed.

Example 13

The reaction was conducted under the conditions similar to those of Example 12, except that the ammonium salt of N-nitrosophenylhydroxylamine employed in said Example was replaced by 29 g (0.2 mol) of aluminium salt of N-nitrosophenylhydroxylamine. The reaction product obtained was formulated into a coating liquid of an anti-scalant.

The coating liquid was used in the similar manner to Example 12, and polymerization of vinyl chloride was carried out similarly to the same Example. It was found that, similarly to Example 12, build-up in the polymerization vessel was not observed at all, and polymerization of 10 batches of vinyl chloride was possible.

Example 14

The reaction was conducted under the conditions similar to those of Example 12, except that the pyrogallol employed in said Example was replaced by 19 g (0.2 mol) of phenol (carbolic acid). The reaction product obtained was formulated into a coating liquid of an anti-scalant.

The coating liquid was used in the similar manner to Example 12, and polymerization of vinyl chloride was carried out similarly to the same Example. It was found that, similarly to Example 12, build-up in the polymerization vessel was not observed at all, and continuous polymerization of 10 batches of vinyl chloride was possible.

Example 15

The reaction was conducted under the conditions similar to those of Example 1, and the resultant reaction product was dissolved in methanol at a concentration of 0.5 % by weight, and applied to the inside of a polymerization vessel, at an application ratio of 0.1 g/m². Then the methanol was evaporated. Into the polymerization vessel charged were 1000 kg of deionized water, 700 g of partially saponified polyvinyl alcohol, 250 g of t-butyl peroxypivalate and 100 kg of vinyl acetate. Following deaeration of inside of the vessel, 600 kg of vinyl chloride was charged into the vessel and polymerized at 60° C. under stirring. At the time when the pressure inside the polymerization vessel was dropped to 5.0 kg/cm², unreacted monomers were purged and the polymerization was terminated. After the content was withdrawn from the polymerization vessel, no build-up on inner walls of the vessel was observed.

Example 16

The reaction was conducted under the conditions similar to those of Example 1, and the resultant reaction product was dissolved in methanol at a concentration of 0.5 % by weight, and applied to the inside of a polymerization vessel, at an application ratio of 0.1 g/m². Then the methanol was evaporated. Into the polymerization vessel charged were 1000 kg of deionized water, 350 g of partially saponified polyvinyl alcohol and 500 g of t-butyl peroxypivalate. Following deaeration of inside of the vessel, 600 kg of vinyl chloride and 20 kg of propylene were charged into the vessel and polymerized at 65° C. under stirring. At the time when the pressure inside the polymerization vessel was dropped by 2.0 kg/cm² from the initial pressure, unreacted monomers were purged and the polymerization was terminated. After the content was withdrawn from the polymerization vessel, no build-up on inner walls of the vessel was observed.

Comparative Example 1

In Example 1, the application of the coating liquid onto the polymerization vessel was omitted and the polymerization was carried out in the similar manner. The polymerization time required was 5 hours and 10 minutes, and the build-up on the inner walls of the polymerization vessel was 350 g/m².

The resultant vinyl chloride polymer had an average degree of polymerization of 1030, bulk density of 0.51 g/ml, a particle size distribution of 81 % passage through a 100-mesh sieve, and the number of fish-eyes of 8.

Comparative Example 2

Ammonium salt of N-nitrosophenylhydroxylamine was dissolved in methanol to form a coating liquid at a concentration of 0.5 % by weight. After applying the coating liquid onto the same polymerization vessel as employed in Example 1 at a ratio of 0.1 g/m² (solid content), polymerization of vinyl chloride was practiced in the vessel similarly to Example 1.

As the result, the vinyl chloride polymer build-up on the inner walls of the polymerization vessel after the polymerization was 320 g/m². The physical properties and performance of the resultant polymer were approximately the same to those of the product of Comparative Example 1.

Comparative Example 3

In a three-necked flask, equipped with a reflux condenser and an agitator, 25 g of pyrogallol and 20 g of phosphoric acid were dissolved in 200 ml of water, and then 9 g of acetaldehyde was added. The inside temperature of the flask was gradually raised to 95° C. under stirring. At said temperature the reaction was continued for 6 hours under reflux, to provide a water-insoluble, reddish brown resinous reaction product.

The reaction product was dissolved in methanol at a concentration of 0.5 % by weight, and applied onto inner walls of a stainless steel polymerization vessel of 2000 liters in capacity. The application ratio was 0.1 g/m². After evaporating the methanol off, the vessel was used for polymerizing vinyl chloride in the manner similar to Example 1. After the polymerization, localized buildup on said inner walls was observed. The polymerization time was 5 hours and 45 minutes, and the build-up was 30 g/m².

The vinyl chloride polymer obtained was slightly colored to reddish brown. Its degree of polymerization was 1030 and the polymer had a bulk density of 0.51 g/ml, a particle size distribution of 48 % by weight of the particles passing through a 100-mesh sieve, and the number of fish-eye was 22.

We claim:

1. An agent for preventing vinyl chloride polymer build-up, which contains as the effective ingredient a reaction product of the ammonium salt or a metal salt of N-nitrosophenylhydroxylamine with 0.2 to 10 moles of an aldehyde per mole of the salt.

2. The anti-scalant as defined in claim 1, in which the ammonium salt or metal salt of N-nitrosophenylhydroxylamine is selected from the group consisting of the compounds expressed by the formula

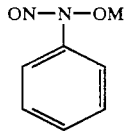

(in which M stands for NH₄ or a metal of Groups IA, IB, IIA, IIIB or VIII of the periodic table).

3. The anti-scalant as defined in claim 1, in which the aldehyde is selected from the group consisting of the compounds expressed by the formula, R-CHO (in which R stands for hydrogen, a $C_{1-15}$ alkyl, aryl which may be substituted with a lower alkyl, or heterocyclic group).

4. A process for the preparation of an agent for preventing vinyl chloride polymer build-up, which comprises reacting the ammonium salt or a metal salt of N-nitrosophenylhydroxylamine with 0.2 to 10 moles of an aldehyde per mole of the salt, in the presence of an acidic catalyst.

5. A process for the preparation of an agent for preventing vinyl chloride polymer build-up which comprises reacting the ammonium salt or a metal salt of N-nitrosophenylhydroxylamine with 0.2 to 10 moles of an aldehyde per mole of the salt in the presence of an acidic catalyst and thereafter further reacting the product with a phenol.

6. A process as defined in claim 4 or 5, in which the ammonium salt or metal salt of N-nitrosophenylhydroxylamine is selected from the group consisting of the compounds expressed by the formula

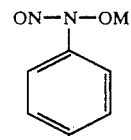

(in which M stands for NH₄ or a metal of Groups IA, IB, IIA, IIIB or VIII of the periodic table).

7. A process as defined in claim 4 or 5, in which the aldehyde is selected from the group consisting of the compounds expressed by the formula, R-CHO (in which R stands for hydrogen, a $C_{1-15}$ alkyl, aryl which may be substituted with a lower alkyl, or heterocyclic group).

8. A process as defined in claim 5, in which the phenol is selected from the group consisting of the compounds expressed by the formula

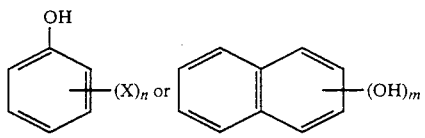

(in which X stands for a $C_{1-4}$ alkyl or hydroxyl group; n is a number of 0-3; and m is a number of 1-3).

9. The agent for preventing vinyl chloride polymer build-up, obtained by the process as defined in claim 5.

10. A method for preventing build-up of vinyl chloride polymer which comprises, in occasions of polymerizing vinyl chloride monomers, applying the antiscalant defined in claim 1 onto the inner walls of the polymerization vessel and the parts of the devices coming into contact with the monomers, in advance of the polymerization.

11. A method for preventing build-up of vinyl chloride polymer which comprises, in occasions of polymerizing vinyl chloride monomers, applying the antiscalant defined in claim 9 onto the inner walls of the polymerization vessel and the parts of the devices coming into contact with the monomers, in advance of the polymerization.

12. The process as defined in claim 4 or 5, in which the salt and the aldehyde are reacted in an aqueous medium.

13. The process as defined in claim 12, in which the salt and the aldehyde are reacted at a temperature of 80° C. to 105° C.

14. The process as defined in claim 4 or 5, in which the acidic catalyst is phosphoric, sulfuric or hydrochloric acid.

* * * * *